US006361894B1

United States Patent
Bronold et al.

(10) Patent No.: US 6,361,894 B1
(45) Date of Patent: Mar. 26, 2002

(54) FUEL CELL SYSTEM WITH ANNULAR SEALING ASSEMBLY

(75) Inventors: Matthias Bronold; Christian Leu, both of Berlin (DE)

(73) Assignee: Heliocentris Energiesysteme GmbH (DE)

( * ) Notice: Subject to any disclaimer, the term of this patent is extended or adjusted under 35 U.S.C. 154(b) by 0 days.

(21) Appl. No.: 09/514,267

(22) Filed: Feb. 28, 2000

(30) Foreign Application Priority Data

Feb. 28, 1999 (DE) .......................................... 199 10 129

(51) Int. Cl.$^7$ ................................................ H01M 8/02
(52) U.S. Cl. ............................. 429/34; 429/35; 429/38
(58) Field of Search ............................. 429/34, 35, 36, 429/37, 38, 39

(56) References Cited

U.S. PATENT DOCUMENTS 6,124,051 A * 9/2000 Johnson et al. ................ 429/26

* cited by examiner

Primary Examiner—Gabrielle Brouillette
Assistant Examiner—Monique Wills

(57) ABSTRACT

A fuel cell stack including bipolar plates disposed between membrane-electrode units. The stack has two end-position monopolar plates. Two current collectors and two end plates enclose the stack on opposite sides said current collectors have at least one collector passage hole with a port end face. The stack includes at least one connection port and substantially annular sealing elements. The two end plates have at least one end plate passage hole communicating with the at least one connection port and the at least one collector passage hole. The sealing elements each have an opening. A single sealing element completely seals the transporting of media between the end face of a connection port and the end-position media-carrying plate by being disposed in the passage holes in the end plate and the current collector for transporting the reaction and cooling media to and from the opening in the adjoining end-position plate.

8 Claims, 1 Drawing Sheet

FUEL CELL SYSTEM WITH ANNULAR SEALING ASSEMBLY

BACKGROUND OF THE INVENTION

Field of the Invention

The invention lies in the field of fuel cells. The invention relates to a fuel cell system for the electrochemical generation of energy, including a fuel cell stack having membrane-electrode units, bipolar plates disposed between the units, respective end-position monopolar plates for transmitting current and guiding reaction and cooling media over the membrane-electrode units, and sealing elements. The fuel cell stack is adjoined on both sides by a current collector and an end plate, each of which have passage holes and connection ports for supplying and removing the reaction and cooling media.

In conventional fuel cells, the seal in the area where the media are supplied to and removed from the end-position monopolar plates is provided at the transitions from the connection port to the end plate, from the end plate to the current collector, and from the current collector to the adjoining media-guiding monopolar plate by respective and separate sealing elements. Therefore, the sealing costs are considerable. In addition, the two current collectors have to be sufficiently thick and, like the end plates, have to be made from a material that is chemically resistant to the reaction and cooling media.

SUMMARY OF THE INVENTION

It is accordingly an object of the invention to provide a fuel cell system for the electrochemical generation of energy that overcomes the hereinafore-mentioned disadvantages of the heretofore-known devices of this general type, that provides a simple and inexpensive configuration of a sealing system for the area of the supply and removal openings for the reaction and cooling media, and that avoids the use of expensive materials for the end plates and current collectors.

With the foregoing and other objects in view, there is provided, in accordance with the invention, a fuel cell system for the electrochemical generation of energy with reaction and cooling media, including membrane-electrode units, bipolar plates disposed between the membrane-electrode units, at least two end-position monopolar plates for transmitting current and guiding reaction and cooling media over the membrane-electrode units, the at least two end-position monopolar plates each having a side face and disposed adjacent and outside the membrane-electrode units, at least two current collectors disposed adjacent and outside the at least two end-position monopolar plates, each of the at least two current collectors having at least one collector passage hole for supplying and removing the reaction and cooling media, at least one connection port having a port end face, at least two end plates disposed adjacent and outside the at least two current collectors, each of the at least two end plates having at least one end plate passage hole communicating with the at least one connection port and the at least one collector passage hole for supplying and removing the reaction and cooling media, substantially annular sealing elements each with an opening, a respective one of the sealing elements disposed in a respective one of the at least one collector passage hole and sealingly contacting, in an area of the opening, the port end face and the side face.

The object of the invention is achieved by disposing a single, substantially annular sealing element in each passage hole in the current collector. The sealing element is in contact with the end face of the connection port and the adjoining monopolar plate in the area of the sealing element opening. The sealing element leaves clear a passage to the opening in the end-position monopolar plate and extends from the end side of the screwed-in connection port to the corresponding monopolar plate and lines the passage area from the end of the connection port to the opening in the outer media-guiding plate.

The configuration and sealing of the fuel cell system in the area where the media are supplied to and removed from the fuel cell stack provides simple, inexpensive sealing that brings with it additional advantages. Specifically, the walls of the two passage holes do not come into contact with the media for the electrochemical reaction and the cooling medium. Consequently, the end plates and current collectors do not have to be made from a chemically resistant and, therefore, expensive material. In addition, the current collector can be made from a less stable plate than before, thereby further reducing costs compared to the prior art fuel cell systems.

In accordance with another feature of the invention, each of the sealing elements is a hollow cylinder and partially projects into a respective one of the at least one end plate passage hole.

In accordance with a further feature of the invention, the at least one end plate passage hole has a given diameter substantially equal to a diameter of the at least one collector passage hole, the opening has an edge area and a diameter smaller than the given diameter, and the sealing element has an end side in the edge area bearing against the side face.

In accordance with an added feature of the invention, the at least one connection port has a thread and each of the at least two end plates has a counter-thread to the thread in the at least one end plate passage hole.

In accordance with an additional feature of the invention, the sealing elements are elastic.

In accordance with yet another feature of the invention, the at least two end-position monopolar plates have at least one end-position opening with a second given diameter and the opening of the sealing elements has a diameter substantially equal to the second given diameter.

In accordance with yet a further feature of the invention, each of the at least two current collectors is a thin-walled metal sheet.

In accordance with a concomitant feature of the invention, the at least one end plate passage hole has a given diameter substantially equal to a diameter of the at least one collector passage hole.

Other features that are considered as characteristic for the invention are set forth in the appended claims.

Although the invention is illustrated and described herein as embodied in a fuel cell system for the electrochemical generation of energy, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
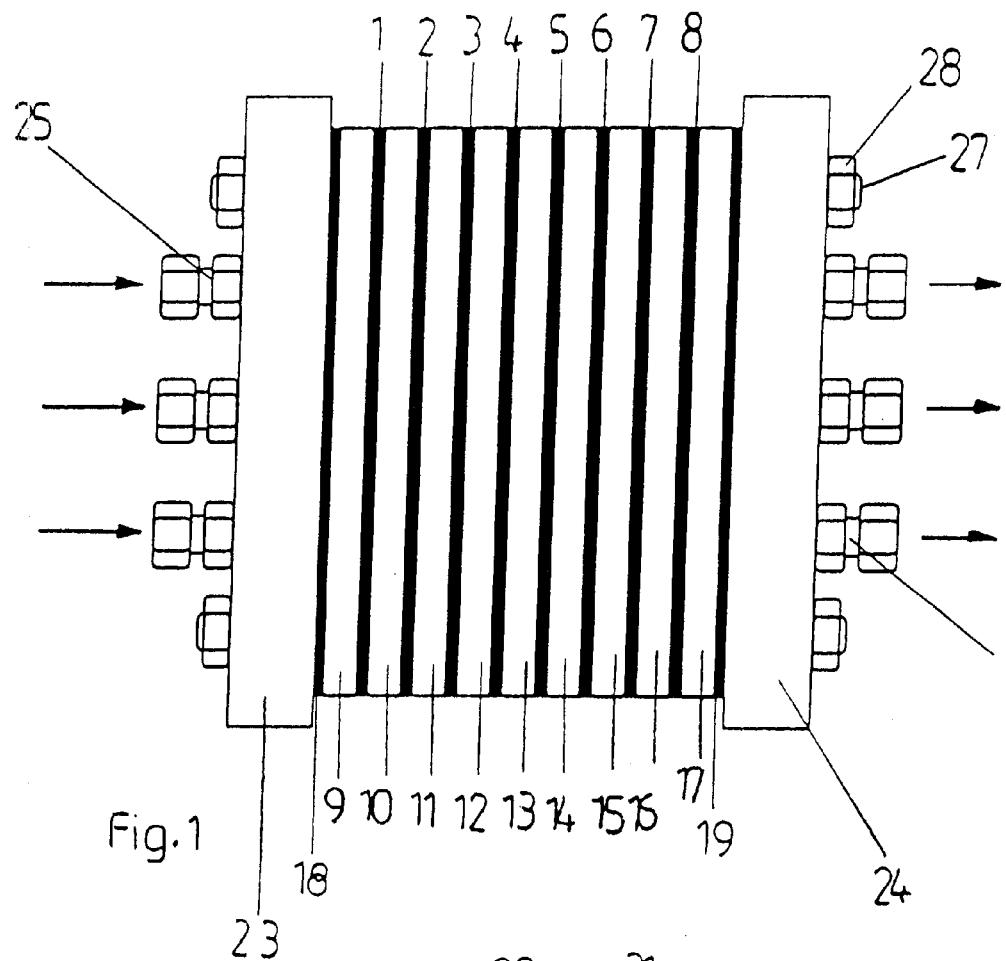
FIG. 1 is a diagrammatic side view of a fuel cell system according to the invention.

In all the figures of the drawing, sub-features and integral parts that correspond to one another bear the same reference symbol in each case.

Referring now to the figures of the drawings in detail and first, particularly to FIG. 1 thereof, there is shown a fuel cell system having a plurality of polymer electrolyte membrane/ electrode units 1 through 8 disposed in parallel. Each of the electrode units 1 through 8 has a polymer electrolyte membrane disposed between two electrodes. Media-guiding conductive plates 10 through 16 are disposed between the electrode units 1 through 8 and end-position plates 9, 17 are disposed outside the two outermost electrode units 1, 8. Media-guiding plates 10 through 16 are bipolar plates and the end-position plates 9 and 17 are monopolar plates. The conductive plates 9 through 17 have channels. First a fuel, particularly hydrogen, and second an oxidant, particularly air, are guided through the channels to the electrode units 1 through 8. The current generated by the electrochemical reactions is conducted to current collectors 18 and removed from the current collectors 18 or is fed to the electrode units 1 through 8 through the current collector 19.

Figure 2:
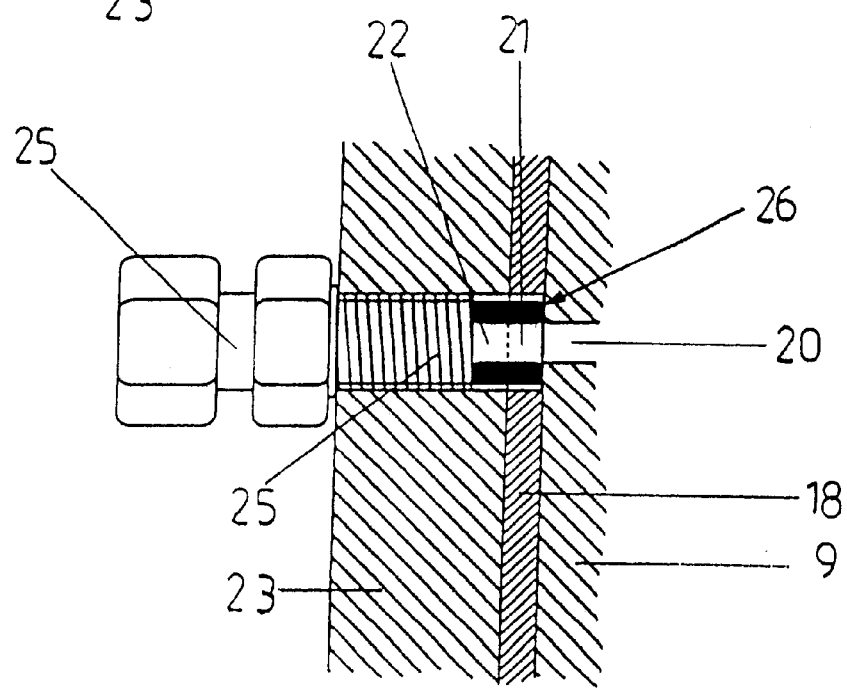
FIG. 2 is a diagrammatic enlarged, partially sectional side view of one side of a medium supply/removal area of the fuel cell system of FIG. 1.

As can be seen from FIG. 2, openings 20 in the end-position media-guiding plates 9 and 17 that adjoin the current collector plates 18, 19 are in communication with passage holes 21 in the corresponding current collector 18, 19 and passage holes 22 in the corresponding end plates 23, 24. The two end plates 23, 24 laterally delimit the fuel cell stack. The diameters of the passage holes 21 and 22 are identical. Threaded bolts 27 and nuts 28 and the end plates 23, 24 join the electrode units 1 through 8, the media-guiding plates 9 through 17, and the current collectors 18, 19 together to form a compact fuel cell stack. Connection ports 25 for supplying and removing fuel, oxidant, and cooling medium are screwed into the passage holes 22, which are partially provided with an internal screw thread 29, in the end plates 23, 24. The seal for the connection ports 25 is produced by a single sealing element 26 positioned in the passage holes 21 and 22 and configured as a hollow cylinder. The sealing element is preferably made from an elastic material. At the end sides of the sealing element 26, one side contacts an end side of the connection port 25 and the other side contacts a side face of an end-position plate 9, 17 adjacent to the current collector 18, 19, specifically, in an edge area of the opening 20. The diameter of the opening 20 is smaller than the diameter of the passage holes 21 and 22.

Thus, the media supply and removal area from the connection port 25 to the respective first media-guiding plate 9, 17 is sealed with a single sealing element, specifically, such that the medium does not come into contact with the end plates 23, 24 and the current collectors 18, 19.

We claim:

1. A fuel cell system for the electrochemical generation of energy, comprising:

membrane-electrode units;

bipolar plates disposed between said membrane-electrode units;

at least two end-position monopolar plates for transmitting current and guiding reaction and cooling media over said membrane-electrode units, said at least two end-position monopolar plates each having a side face and disposed adjacent and outside said membrane-electrode units;

at least two current collectors disposed adjacent and outside said at least two end-position monopolar plates, each of said at least two current collectors having at least one collector passage hole for supplying and removing the reaction and cooling media;

at least one connection port having a port end face;

at least two end plates disposed adjacent and outside said at least two current collectors, each of said at least two end plates having at least one end plate passage hole communicating with said at least one connection port and said at least one collector passage hole for supplying and removing the reaction and cooling media;

substantially annular sealing elements each with an opening, a respective one of said sealing elements disposed in a respective one of said at least one collector passage hole and sealingly contacting, in an area of said opening, said port end face and said side face.

2. The fuel cell system according to claim 1, wherein each of said sealing elements is a hollow cylinder and partially projects into a respective one of said at least one end plate passage hole.

3. The fuel cell system according to claim 1, wherein said at least one end plate passage hole has a given diameter substantially equal to a diameter of said at least one collector passage hole, said opening has an edge area and a diameter smaller than said given diameter, and said sealing element has an end side in said edge area bearing against said side face.

4. The fuel cell system according to claim 1, wherein said at least one connection port has a thread and each of said at least two end plates has a counter-thread to said thread in said at least one end plate passage hole.

5. The fuel cell system according to claim 1, wherein said sealing elements are elastic.

6. The fuel cell system according to claim 1, wherein said at least two end-position monopolar plates have at least one end* position opening with a second given diameter and said opening of said sealing elements has a diameter substantially equal to said second given diameter.

7. The fuel cell system according to claim 1, wherein each of said at least two current collectors is a thin-walled metal sheet.

8. The fuel cell system according to claim 1, wherein said at least one end plate passage hole has a given diameter substantially equal to a diameter of said at least one collector passage hole.

* * * * *